United States Patent [19]
Duecker

[11] 3,763,888
[45] Oct. 9, 1973

[54] ASPIRATING VALVE
[76] Inventor: Willard John Duecker, 1041 Cameron Way, Stockton, Calif. 95207
[22] Filed: Apr. 26, 1972
[21] Appl. No.: 247,557

[52] U.S. Cl.................... 137/604, 239/70, 239/318
[51] Int. Cl............................................ F16k 19/00
[58] Field of Search.................... 137/604; 239/318, 239/70

[56] References Cited
UNITED STATES PATENTS
| | | | |
|---|---|---|---|
| 2,919,073 | 12/1959 | Akselrad........................ | 239/318 X |
| 3,231,200 | 1/1966 | Heald............................. | 137/604 X |
| 3,486,695 | 12/1969 | Novak............................ | 239/318 X |

Primary Examiner—Robert G. Nilson
Attorney—Robert G. West et al.

[57] ABSTRACT

A valve body with a water passageway having a Venturi portion is interposed in a water line, adjacent a shower head, for example. Fluids, such as shampoos, liquid soaps, detergents, bath oils, and the like, are introduced into the water stream at the Venturi throat, a fluid flow channel in the valve body extending to the throat from a fluid supply reservoir removably connected to the valve body. Interposed in the fluid flow path is a hollow actuator rod translatable in a cross bore formed in the valve body. In "ON" position, an annular groove in the rod periphery is in register with the adjacent channel ports to permit fluid to flow from the reservoir into the water stream. In "OFF" position, an annular slot in the rod periphery is in register with the adjacent channel ports, the suction being broken, however, by openings connecting the annular slot with a central hollow bore in the actuator rod open to the atmosphere. For institutional applications, the duration of the "ON" period is timed, and the valve is automatically closed at the end of a predetermined period.

6 Claims, 5 Drawing Figures

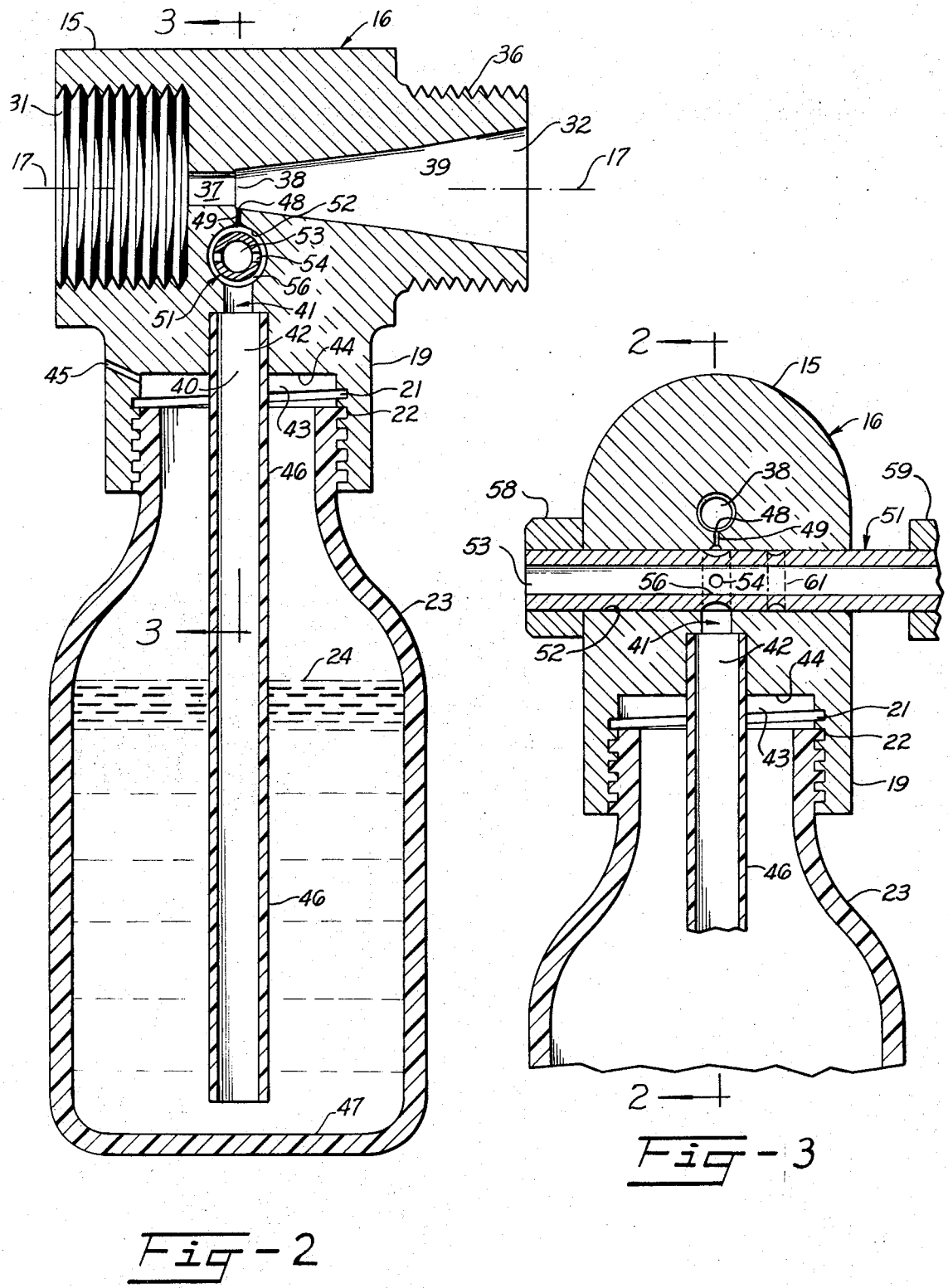

ASPIRATING VALVE

The invention relates to improvements in valves capable of introducing and mixing relatively small quantities of fluid, such as shampoo, or detergent, into a water stream.

The market place, as well as the patent literature is replete with devices capable of withdrawing, from a source of supply, small quantities of fluids, such as liquid shampoo, soap, detergent, bath oil, and the like, and introducing the fluid into a stream of water by aspiration. However, so far as is known, none of these devices has been capable of operating efficiently for protracted periods of time without clogging and without structural deterioration of the operating mechanism.

It is therefore an object of the invention to provide an aspirating valve which can be alternated between fully "OFF" and fully "ON" positions quickly and efficiently, and without clogging or leaking, for protracted lengths of time.

It is another object of the invention to provide an aspirating valve which is compatible with all existing types of plumbing equipment and accessories.

It is still another object of the invention to provide an aspirating valve which is relatively economical yet is durable and long-lived, and has but a minimum of moving parts to get out of order.

It is yet another object of the invention to provide an aspirating valve which is readily operated by persons of any age group.

It is still a further object to provide a valve in which the period of aspiration can be controlled.

It is a further object of the invention to provide a generally improved aspirating valve.

Other objects, together with the foregoing, are attained in the embodiments described in the following description and shown in the accompanying drawings in which:

FIG. 2 is a vertical sectional view, to an enlarged scale, of the FIG. 1 form of device, taken on the plane indicated by the line 2—2 in FIG. 3;

FIG. 3 is a fragmentary vertical sectional view, to an enlarged scale of the FIG. 1 form of device, the plane of the section being indicated by the line 3—3 in FIG. 2, and showing the actuator rod in "OFF" position;

Figure 1:
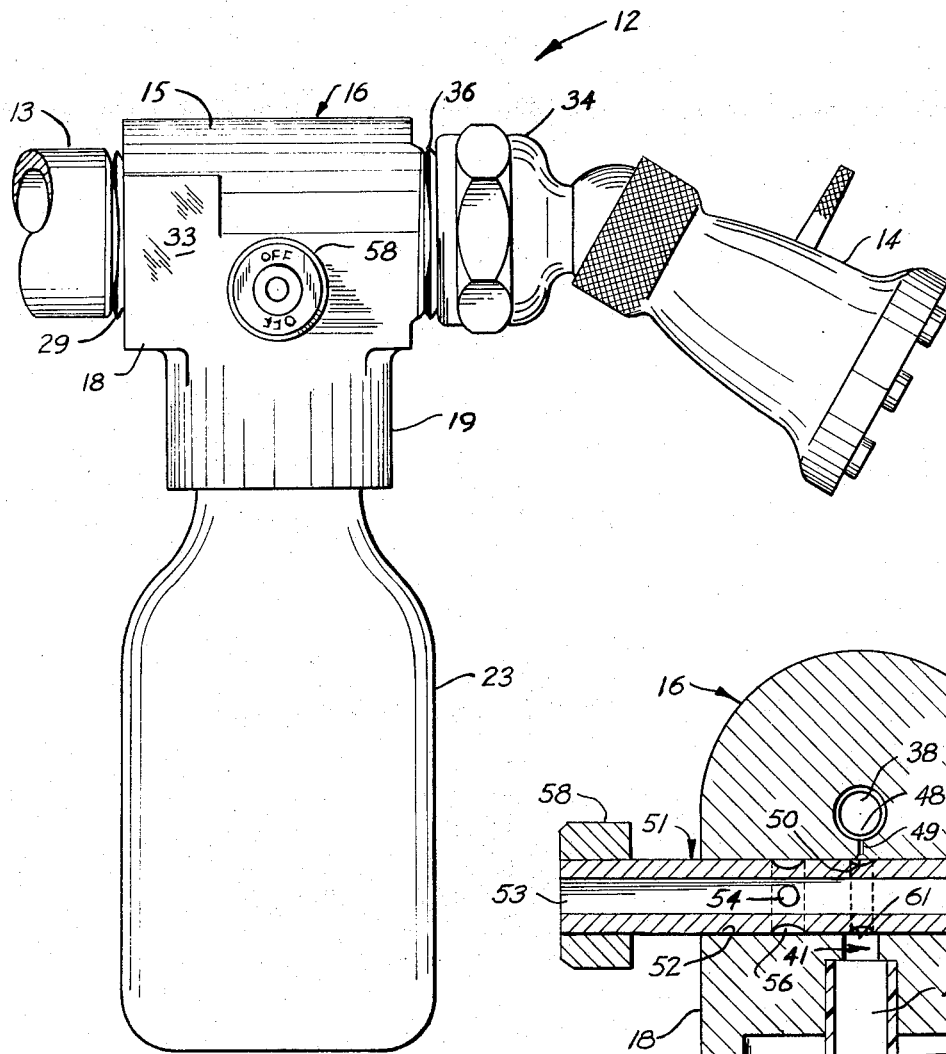
FIG. 1 is a side elevational view showing a typical installation in conjunction with a shower head.

While the aspirating valve of the invention is susceptible of numerous physical embodiments, depending upon the environment and requirements of use, substantial numbers of the herein shown and described embodiments have been made, tested, sold and used, and all have performed in an eminently satisfactory manner.

The aspirating valve of the invention, generally designated by the reference numeral 12, is frequently installed between the inlet pipe 13 and head 14 of a bathroom shower.

The upper portion 15 of valve body 16 is generally hemispherical in a section transverse to the fore and aft flow axis 17 (see FIG. 2) and the lower portion 18 of the body includes a depending fitting 19 interiorly threaded at 21 to receive the exteriorly threaded neck 22 of a container 23, such as a "plastic" bottle filled with a fluid 24 to be injected in the main water flow to the shower head. The fluid 24 can be of any desired material and often is a liquid form of soap, detergent, shampoo or bath oil.

Installation of the valve 16 is effected by engaging the external pipe threads 29 on the pipe 13 with the internal threads 31 on the upstream end of a fore and aft water flow passageway, generally designated by the reference numeral 32, coaxially disposed on the fore and aft axis 17. A flattened portion 33 on opposite sides of the upper valve body (see FIG. 1) facilitates the application of a wrench to assist in rotating the valve body into tight engagement with the inlet pipe 13. At the forward, discharge end of the water passageway 32, the shower head 14 is secured to the valve body by appropriate engagement between a shower head fitting 34 and the externally threaded nipple 36 on the forward end of the valve body.

As appears most clearly in FIGS. 1 and 2, the horizontal, fore and aft passageway 32 in the valve body comprises not only the enlarged entry portion into which the connected inlet pipe 13 protrudes, but also a greatly reduced cylindrical portion 37 opening into the base 38, or throat, of a forwardly diverging chamber 39, forming a Venturi configuration.

Aspiration of fluid 24 from the fluid source of supply 23, and injection of the fluid into the main water stream is effected by the provision of a two-part vertical channel, generally designated by the numeral 41, extending between the fluid supply and the Venturi throat 38.

The channel 41 includes a lower somewhat enlarged, cylindrical portion 42, in communication through orifice 40 with the chamber 43, the chamber 43 being defined by the upper end of the fluid container 23 and the adjacent inner surface 44 of the internally threaded fitting 19.

The orifice portion 42 of the channel has a diameter such as snugly to receive in frictional engagement the upper end of a "plastic" tube 46 extending downwardly in the fluid reservoir 24 below the fluid surface and reaching almost to the bottom 47 of the container, as appears most clearly in FIG. 2.

A vent 45 in the valve body connects the chamber 43 and the atmosphere.

Where the channel 41 enters the Venturi throat 38, the diameter is constricted, as indicated by the Venturi port 48 and attendant upper channel portion 49, or aperture.

Interposed in the channel 41 between the upper channel portion 49 and the lower channel portion 42 so as to effect control of fluid flow is a hollow actuator rod 51 translatably disposed in a cross-bore 52 formed in the valve body just below the Venturi throat 38. Extending axially through the rod 51 is a hole 53 affording communication between the atmosphere and a pair of apertures 54 in communication with an annular slot 56 circumscribed in the outer periphery of the actuator rod 51.

Mounted on the ends of the rod 51 are limit stops in the form of spacer-indicator knobs including an "OFF" knob 58 at the left-hand end of the rod when looking upstream and an "ON" knob 59 at the opposite end. Preferably, the "ON" knob 59 is larger in size than the "OFF" knob 58 so that the two can be distinguished by touch alone, a convenience for the user when shampooing, for example.

The knobs 58 and 59 are separated by a distance exceeding the length of the transverse bore 52 by an amount equal to the separation between the groove 61 and the slot 56; thus by abutting one or the other of the knobs against the valve body, the groove 61 and the slot 56 are brought into respective register with the channel 41.

As appears most clearly in FIG. 3, when the valve is to be turned off, the "OFF" knob 58 is pushed until it is in face to face engagement with the adjacent outer surface of the valve body. Then, the circumferential slot 56 is in register, along its lower periphery, with the adjacent portion of the relatively large lower channel portion 42, and along its upper periphery with the relatively small upper channel portion 49. Concurrently, however, the drilled openings 54 afford communication between the slot 56 and the atmosphere. Thus, even though water might be flowing from the inlet pipe 13, through the passageway 32 and out the shower head 14, no fluid is aspirated from the supply bottle 23 and injected into the water stream. The reason is that the atmospheric pressure in the hole 53 and in the rod openings 54 and slot 56 is substantially balanced by the atmospheric pressure in the channel portion 42, in the vent 45 and in the chamber 43 and the space above the surface of the fluid 24; fluid is therefore not withdrawn from the fluid supply reservoir 24.

Such aspiration as may take place at the Venturi port 48 of the aperture 49 is readily supplied by the atmospheric air available at the openings 54 and the connecting annular slot 56 in communication with the aperture 49. A small amount of air, in other words, may at times be injected into the flowing water stream. When the water is subsequently turned off, the water quickly drains away through the shower head nozzle and substantially none finds it way down through the minute port 48 and aperture 49. Thus, the fluid in the bottle 23 does not become diluted by water from the shower passageway.

Figure 4:
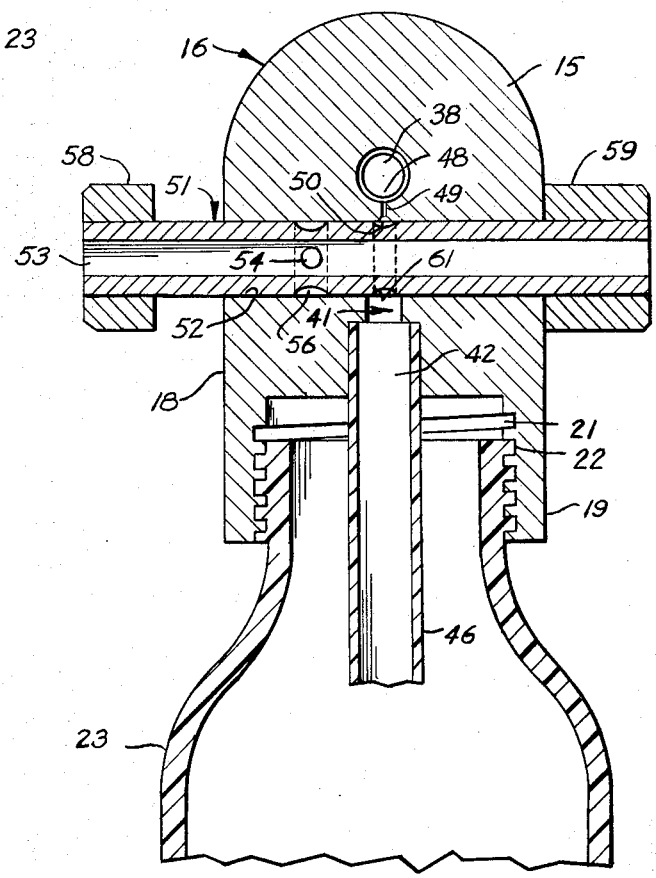
FIG. 4 is a view comparable to FIG. 3, but showing the actuator rod in "ON" position; and, FIG. 5 is a view comparable to FIGS. 3 and 4 but showing a metered orifice type of automatic closure rod for use in institutional applications and omitting the fluid supply bottle.

In "ON" position, the "ON" knob 59 abuts the adjacent face of the valve body (see FIG. 4) and in this position of the rod 51, the lower portion 42 of the channel 41 is in register with the lower periphery of an annular groove 61 formed in the circumference of the rod. Concurrently, the upper periphery of the annular groove 61 is in register with the countersunk lower end 50 of the vertical aperture 49. Thus, the "suction" or reduced, subatmospheric, aspirating pressure availabe at the upper Venturi port 48 as a result of the swift flow of water through the Venturi throat 38, is communicated downwardly through the aperture 49 and the groove 61, thence through the "plastic" tube 46. The differential between the reduced throat pressure and the higher atmospheric pressure available through the vent 45 and on top of the fluid surface is effective to force the fluid 24 upwardly through the tube 46, thence through the lower run 42 of the channel 42, along the peripheral groove 61, thence through the upper channel run 49 and then inject the fluid through the Venturi port 48 and into the shower stream with which the fluid merges.

In operaton, the user customarily first turns on and balances the hot and cold flows to attain the desired volume and degree of water temperature. Then, after wetting the hair, for example, the actuator rod is switched from "OFF" to "ON" by pushing the "ON" knob into abutment with the valve body. The liquid soap or shampoo inside the bottle is thereupon "sucked up" and injected into the water stream so that as the water-fluid mixture emerges from the shower head it can be directed into the hair. After sufficient material is dispensed, the rod is moved into "OFF" position by pushing against the "OFF" knob in the opposite direction until it abuts the adjacent wall of the valve body. This cycle can be repeated several times, if desired, until the shampoo is completed. At the conclusion of the shower, the main water valves are shut off, in customary fashion.

In order to replenish the fluid supply, the empty bottle 23 is unscrewed from the fitting 19 for replacement or for refilling from another container.

When initially installed, the "plastic" tube 46 is inserted through the orifice 40 into the recessed lower channel portion 42 where it is frictionally held in place. To replace the tube 46, it is merely necessary to pull the tube out of the cylindrical channel recess 42 in the bottom 44 of the valve body and insert a new tube.

In some installations, for example, in institutional applications, it is desirable that the control rod be maintained in open or "ON" position for only a predetermined limited period of time so that the entire supply of fluid is not wasted as a consequence of the user's forgetfulness or lack of interest.

Figure 5:
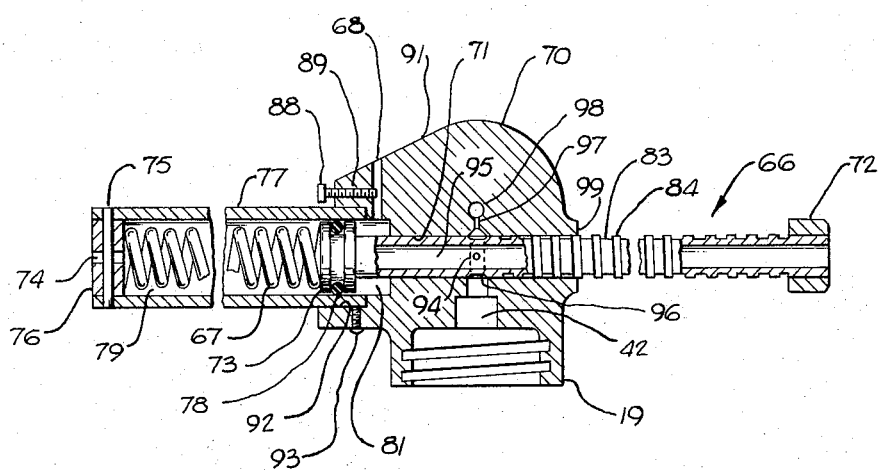

Accordingly, I have provided a modified form of actuator rod 66, as appears in FIG. 5, wherein movement of the rod is spring-actuated by spring 67 in moving from "ON" to "OFF" position, and the return time is controlled by a metered orifice 68.

The hollow rod 66 is elongated and extends, as before, through a cross-bore 71 in the valve body 70. At the right-hand end of the rod as appears in FIG. 5, there is mounted an "ON" knob 72 which is pushed fully toward the left, as appears in FIG. 5, to start the flow of fluid from the supply reservoir (not shown).

Translation of the rod 66 to the left causes a corresponding left-hand movement of a piston 73 on the left-hand end of the rod, the piston 73 compressing the helical spring 67 interposed between the piston and an annular end plug 76 secured by a cross-pin 75 in the left-hand end of a hollow cylinder 77 mounted on the valve body. As the piston 73 with its O-ring washer 78 is urged against spring pressure in a left-hand direction, as appears in FIG. 5, the air ahead of the piston 73 is vented to the atmosphere through the central aperture 74 in the plug 76. Concurrently, air is drawn in through the metering orifice 68 to occupy the space behind the piston 73 in the right-hand chamber 81.

In the form of rod shown in FIG. 5, the grooves 83 are alternated with lands 84, fluid feed being therefore intermittent rather than continuous in nature, as the rod is returned by spring force from fully "ON" position to the fully "OFF" position shown in full line in FIG. 5. Resistance to closing movement of the piston 73 and the rod 66 is offered by the orifice 68 venting air in the right-hand chamber 81 to the atmosphere. The extent of opening of the orifice 68 can be controlled by appropriate movement of a metering pin 88 in threaded engagement with a drilled and tapped opening 89 in the valve body boss 91 on which the cylinder is mounted, the base of the cylinder 77 being placed in a cylindrical recess 92 and secured by a set screw 93, for example.

As before, in closed or "OFF" position, a pair of apertures 94 afford communication between the atmosphere extending into the hollow central opening 95 in the rod and into the peripheral groove 96, the vertical aperture 97 and the throat 98 of the fore and aft water passageway, and thereby breaks the "suction."

In operating the institutional type of valve 66, the main water flow rate and temperature is first established, followed by pushing the "ON" knob 72 in a left-hand direction as appears in FIG. 5, until it abuts the small boss 99 on the adjacent side of the valve body. The knob 72 is thereupon released and spring compression urges the rod toward the right. Intermittent fluid flow thereupon occurs as the lands and grooves on the rod are slowly moved toward the right under urgency of the compression spring, right-hand movement being slowed in dependence upon the extent of opening of the air vent orifice 68.

Upon reaching the fully projected "OFF" position shown in FIG. 5, the suction or syphoning effect is interrupted by reason of the air openings 94, and fluid flow is thereby stopped. By appropriate setting of the metering screw 88, any desired dwell, or operation time, within limits, can be established.

It can therefore be seen that I have provided an aspirating valve which serves positively and effectively to dispense either a virtually unlimited supply or a predetermined timed charge of fluid into a shower or bath water stream.

What is claimed is:

1. An aspirating valve comprising:
   a. a valve body having formed therein a fore and aft passageway extending from an upstream water supply port to a downstream discharge port, said passageway including a Venturi portion; said valve body also having formed therein a transverse bore adjacent said passageway, and a channel having a first run extending between said Venturi portion of said passageway and a first opening in the walls of said bore and a second run extending between a second opening in the walls of said bore and a fluid supply orifice; and,
   b. an actuator rod translatably disposed in said transverse bore, said rod being movable between
      1. an "on" position wherein said first opening and said second opening in the walls of said bore and interconnected by an uninterrupted cavity comprising a peripheral groove formed in said rod to afford a sub-atmospheric pressure in said channel capable of aspirating fluid from a fluid supply reservoir connected to said orifice, said first opening and said second opening being in facing relation on opposite walls of said bore and in register with said groove in said "on" position of said actuator rod to conduct fluid passing from said orifice through said second run of said channel thence through said peripheral groove in said rod and through said first run of said channel and discharging into said Venturi portion to merge with water flowing through said passageway, and
      2. an "off" position wherein said first opening and said second opening are interconnected by a conduit comprising a peripheral slot formed in said rod axially removed a predetermined distance from said peripheral groove, said peripheral slot being interrupted by an aperture comprising an axial hole bored through said rod and connected to said peripheral slot through a recess, atmospheric air being thereby capable of passing into said slot and effective to break the aspirating effect of said Venturi on said fluid supply.

2. An aspirating valve as in claim 1 including a pair of limit stops on the ends of said rod separated by a distance greater than the length of said transverse bore by an amount substantially equal to said predetermined amount of axial separation between said slot and said groove, and said transverse bore extends between opposite sides of said valve body, said limit stops being capable of defining the extent of to and fro axial movement of said actuator rod between said "on" position and said "off" position.

3. An aspirating valve as in claim 2 wherein said upstream port of said passageway is interiorly threaded and said discharge port is formed in an exteriorly threaded nipple projecting from said valve body.

4. An aspirating valve as in claim 3 wherein said orifice is encompassed by a threaded fitting capable of engaging a removable fluid supply reservoir.

5. An aspirating valve as in claim 4 further including a tubing connected to said orifice and extending below the fluid surface in said supply reservoir, and an air supply vent in said valve body connecting the space above said fluid surface to the atmosphere.

6. An aspirating valve as in claim 5 including spring-biased and metered-orifice timer means on said valve for moving said rod from "on" position to "off" position after a predetermined dwell time in "on" position.

* * * * *